E. W. KING.
Couplings for Vacuum Car-Brake Pipes.
No. 151,885. Patented June 9, 1874.
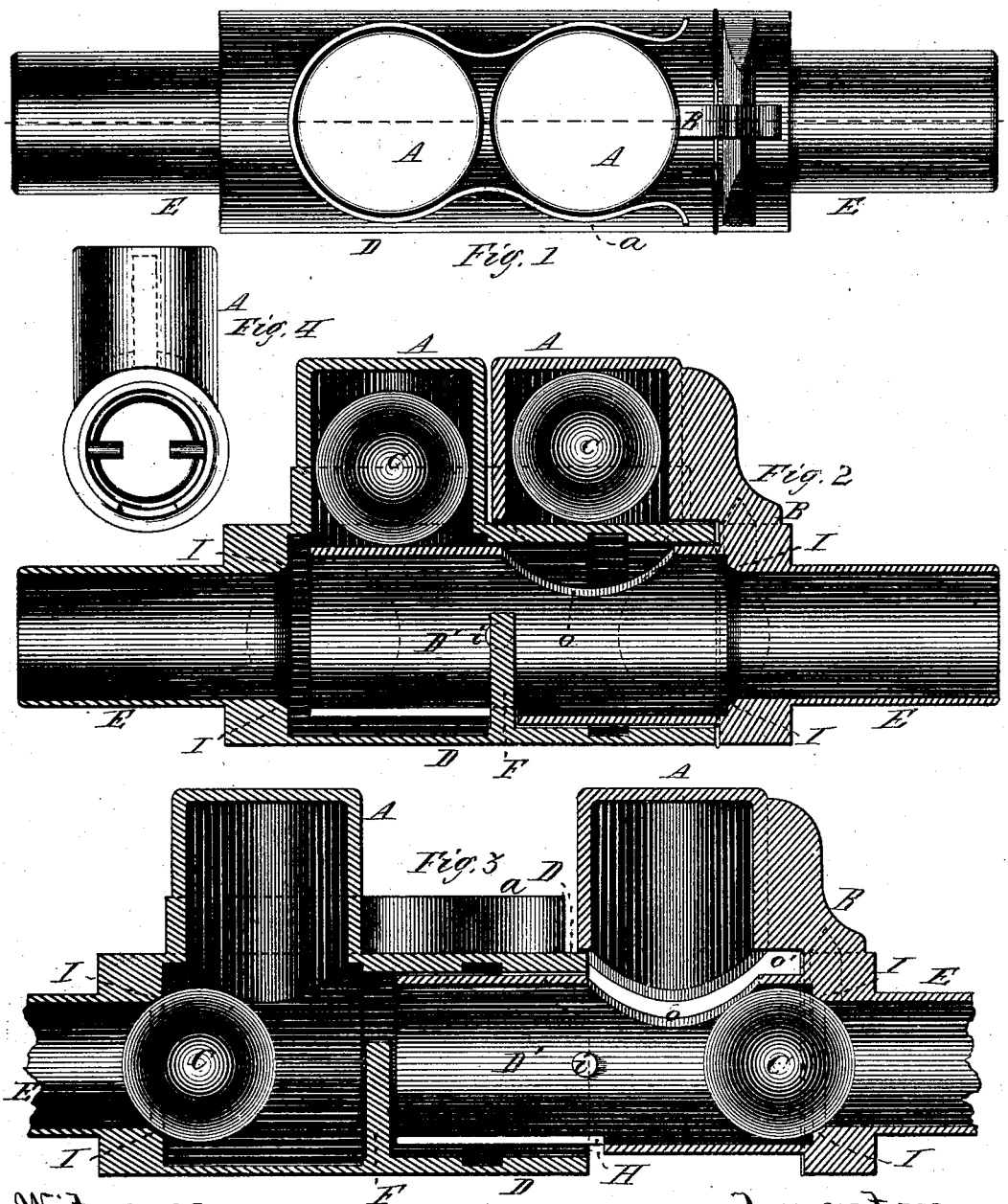

UNITED STATES PATENT OFFICE.

EDWARD W. KING, OF SPRINGFIELD, MASSACHUSETTS, ASSIGNOR TO HIMSELF AND HENRY C. THRALL.

IMPROVEMENT IN COUPLINGS FOR VACUUM CAR-BRAKE PIPES.

Specification forming part of Letters Patent No. 151,885, dated June 9, 1874; application filed May 7, 1874.

*To all whom it may concern:*

Be it known that I, EDWARD W. KING, of Springfield, in the State of Massachusetts, have invented a new and useful Improved Coupling for Vacuum Car-Brake Pipes; and I do hereby declare that the following is a full, clear, and exact description thereof, reference being had to the accompanying drawings, making a part of this specification, and to the letters of reference marked thereon, in which—

Figure 1 is a plan view of my invention. Fig. 2 is a longitudinal section of the same, showing the coupling secured together, with the balls held up in their housings when the coupling is so secured. Fig. 3 is a longitudinal section, showing the operation of the coupling when the parts are detached from each other, and the balls dropped down into their chambers, and forced to their seats by the current of air rushing into the pipes; and Fig. 4 is an end view of one of the coupling-pipes.

My invention relates to an improved coupling for vacuum car-brake pipes, to be used upon a railway-train for braking all the cars of a railway-train at once; and it consists of two pipes, one sliding into the other, and each provided with a valve-chamber and a seat inside, and a housing above the chamber. A rubber ball is placed in each chamber, and is prevented from falling out the end of the pipe by a pin extending inward across the pipe, and each pipe or valve-chamber is so arranged that when turned so that the housing is downward the ball in the chamber will drop into the housing, and the pipes being then secured together they may be turned so that the housings will be uppermost, and the pipes hold the balls up in their housings until the couplings or pipes are detached from each other, when the balls are free to fall down into their chambers.

In the drawings, E represents the pipes, which are attached to the hose connecting the pipes, which extend along beneath the cars of a railway-train, leading from the engine to the vacuum-chamber beneath each car, and upon the end of each pipe E is made a larger pipe, D or D′, and of such comparative diameter that one pipe, D′, may be inserted into the other pipe, D. One of these pipes, D, is provided with a housing, A, opening into its pipe D, as seen clearly in Fig. 3, and the other pipe, D′, is also provided with a similar housing, A, which is attached to and supported upon its pipe D′ by a piece, B, and this pipe D′ has an opening, o, made therein, of sufficient size to permit the ball to pass through, and this housing is held above its pipe with a space, o′, between its lower end and the pipe, sufficient to admit the thickness of the other pipe, D, to pass in between the housing and its pipe, as seen clearly in Fig. 4. The end of the pipe E forms a seat at I, where it enters the pipe D or D′, and a spring, a, secured to one of the housings A, clasps the other housing when the pipes are inserted one within the other, and serves to hold the coupling together, although, when the brake is in use, the action of the air in tending to rush into the pipes operates to hold the coupling together to a great extent. A rubber ball, C, of a size somewhat larger than the inside diameter of the pipe E, is inserted into each pipe D D′, and a pin, F, fastened into the pipe D or D′, extending across it inside or partially across it, to prevent the ball from falling out the end of the pipe when the parts of the coupling are not secured together.

When the pipes D D′ are uncoupled, the balls C rest either in their chambers in the pipe D or in their housings; but when it is desired to couple the pipes together, they are both turned with the housings A downward, and the balls C drop into the housings. The pipes D D′ are then inserted one into the other or coupled together, and when so coupled the spring a of one housing clasps around the other housing, and each pipe D D′ passes in beneath the opposite housing on the other pipe, and holds the balls up in said housings, and prevents them from dropping down into the pipe; but as soon as the parts are uncoupled, or the pipes D D′ pulled out one from the other, the balls C are free to drop down from their housings A into the pipes D D′, and, if at this time the air has been exhausted from the vacuum-chamber, the tendency of the air to rush back into the chamber through the pipe will force the ball C firmly against its seat I, and the rush of air inward will be suddenly stopped.

To couple the device, it will only be necessary to turn the pipes D D' so that the balls C may drop into the housings, and when coupled the pipes are turned so that the housings will be uppermost, and the balls C ready to drop into their chambers in the pipes D D'. One of the pipes, D', (that which is inside the other,) has a slot, H, made therein, for the pin F in the opposite pipe, D, to slide in when the pipes are coupled together.

It will be seen that, as thus arranged, if the air be exhausted from the vacuum-chambers of the cars, and any one of the cars should become detached from the train, the balls would drop from their housings in the broken coupling at the instant of uncoupling, and the air prevented from entering the vacuum-chamber, and the brakes would be applied; and should the brakeman neglect to couple the two pipes D D' at the rear end of the rear car, the balls C would adjust themselves to the seats I as soon as the air began to be exhausted from the vacuum-chamber, so that in no case would the brakes fail to be applied.

Having thus described my invention, what I claim as new is—

1. In an improved coupling for vacuum car-brake pipes, the two pipes D D', each provided with a seat, I, a housing, A, an opening from each pipe into its housing, and a ball, C, all substantially as described.

2. The combination of the pipes D D', each provided with a seat, I, and pin F, or other suitable device for preventing the ball from being lost out of the pipe, the housings A, balls C, and spring a, all substantially as described.

EDWARD W. KING.

Witnesses:
T. A. CURTIS,
C. E. BUCKLAND.